US009652026B2

(12) United States Patent
Park et al.

(10) Patent No.: US 9,652,026 B2
(45) Date of Patent: May 16, 2017

(54) SYSTEM AND METHOD FOR PEAK DYNAMIC POWER MANAGEMENT IN A PORTABLE COMPUTING DEVICE

(71) Applicant: QUALCOMM INCORPORATED, San Diego, CA (US)

(72) Inventors: Hee-Jun Park, San Diego, CA (US); Parag Arun Agashe, San Diego, CA (US); Mohammad Tamjidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/578,437

(22) Filed: Dec. 21, 2014

(65) Prior Publication Data

US 2016/0179164 A1    Jun. 23, 2016

(51) Int. Cl.
G06F 1/32    (2006.01)
G06F 1/16    (2006.01)

(52) U.S. Cl.
CPC ............ *G06F 1/324* (2013.01); *G06F 1/1613* (2013.01); *G06F 1/3203* (2013.01); *G06F 1/3206* (2013.01); *G06F 1/329* (2013.01); *G06F 1/3212* (2013.01); *G06F 1/3234* (2013.01); *G06F 1/3243* (2013.01); *G06F 1/3287* (2013.01); *G06F 1/3296* (2013.01); *Y02B 60/1217* (2013.01); *Y02B 60/1239* (2013.01);
(Continued)

(58) Field of Classification Search
CPC ....... G06F 1/3212; G06F 1/324; G06F 1/3287
See application file for complete search history.

(56) References Cited

U.S. PATENT DOCUMENTS 6,795,927 B1 * 9/2004 Altmejd ................ G06F 1/3203
713/300
6,834,353 B2 * 12/2004 Smith ................... G06F 1/3203
713/300
(Continued)

FOREIGN PATENT DOCUMENTS

CN    102866291 A    1/2013

OTHER PUBLICATIONS

Aseem Gupta et al; LEAF: A System Level Leakage-Aware Floor planner for SoCs, IEEE conference on Embedded systems, 2007 pp. 274-279.

(Continued)

*Primary Examiner* — Chun Cao
(74) *Attorney, Agent, or Firm* — Smith Tempel Blaha LLC

(57) ABSTRACT

Various embodiments of methods and systems for dynamically adjusting a peak dynamic power threshold are disclosed. Advantageously, embodiments of the solution for peak dynamic power management optimize a peak dynamic power threshold based on estimations of real-time leakage current levels and/or actual power supply levels to a power domain of a system on a chip ("SoC"). In this way, embodiments of the solution ensure that a maximum amount of available power supply is allocated to dynamic power consumption for processing workloads at an optimum performance or quality of service ("QoS") level without risking that the total power consumption (leakage power consumption+dynamic power consumption) for the power domain exceeds the power supply capacity.

30 Claims, 8 Drawing Sheets

(52) U.S. Cl.
CPC ....... *Y02B 60/1285* (2013.01); *Y02B 60/1292* (2013.01); *Y02B 60/144* (2013.01)

(56) References Cited

U.S. PATENT DOCUMENTS

| | | | |
|---|---|---|---|
| 6,842,714 B1 | 1/2005 | Acar et al. | |
| 7,050,959 B1* | 5/2006 | Pollard, II | G05D 23/1917 700/293 |
| 7,539,881 B2* | 5/2009 | Shaw | G06F 1/3203 713/300 |
| 7,661,003 B2 | 2/2010 | Naffziger et al. | |
| 8,527,794 B2 | 9/2013 | Ibrahim et al. | |
| 2007/0005152 A1* | 1/2007 | Karr | G06F 1/28 700/22 |
| 2008/0022140 A1* | 1/2008 | Yamada | G06F 1/206 713/322 |
| 2011/0291746 A1 | 12/2011 | Ibrahim et al. | |
| 2013/0138977 A1* | 5/2013 | Herman | G06F 1/3206 713/300 |
| 2014/0006808 A1* | 1/2014 | Sizikov | G06F 1/26 713/300 |

OTHER PUBLICATIONS

International Search Report and Written Opinion—PCT/US2015/061927—ISA/EPO—Feb. 22, 2016.

* cited by examiner

SYSTEM AND METHOD FOR PEAK DYNAMIC POWER MANAGEMENT IN A PORTABLE COMPUTING DEVICE

DESCRIPTION OF THE RELATED ART

Portable computing devices ("PCDs") are powerful devices that are becoming necessities for people on personal and professional levels. Examples of PCDs may include cellular telephones, portable digital assistants ("PDAs"), portable game consoles, palmtop computers, and other portable electronic devices. As users have become more and more reliant on PCDs, demand has increased for more and better functionality. Simultaneously, users have also expected that the quality of service ("QoS") and overall user experience not suffer due to the addition of more and better functionality.

Generally, providing more and better functionality in a PCD drives designers to use larger, more robust power management integrated circuits ("PMIC") and/or larger batteries capable of delivering more mA-Hr of battery capacity. Batteries and PMICs may be sized for "worst case" scenarios of power consumption in the PCD. However, the trend in PCD design is for smaller form factors that often preclude the inclusion of a larger battery or more robust PMIC. Moreover, because the mA-Hr density of available battery technology has stagnated, the inclusion of a higher power density battery in a given size is no longer the answer to support the additional functionality. Rather, to accommodate the additional functionality in today's PCDs, without oversizing the PMIC and battery, the limited amount of available power supply must be managed such that it is leveraged efficiently and user experience is optimized.

Power consuming components on a typical system on a chip ("SoC"), such as processing components, draw power from a power rail that is supplied by a PMIC and regulated by a voltage regulator. If the processing components request an increase in power supply that causes a current threshold for the voltage regulator to be exceeded, then actions must be taken to avoid exceeding the current threshold. For example, the workload and/or the clock frequency setting of one or more processing components may be reduced in an effort to bring the current of the power supply down to a suitable level to avoid performance degradation and/or outright device failure.

Because the current threshold is dictated by the sum of the leakage current and the dynamic current being consumed by the SoC, where the leakage current is a function of the temperature of the processing components on the SoC and the dynamic current is a function of the workload being processed by the processing components, power reduction measures may be avoided by optimizing an allocation of the power supply to dynamic current consumption. Therefore, there is a need in the art for a system and method that adjusts a dynamic power budget threshold in view of the actual leakage power consumption. Moreover, there is a need in the art for a system and method that manages a current supply from a PMIC such that user experience is optimized without exceeding a peak current threshold.

SUMMARY OF THE DISCLOSURE

Various embodiments of methods and systems for dynamically adjusting a peak dynamic power threshold are disclosed. Advantageously, embodiments of the solution for peak dynamic power management optimize a peak dynamic power threshold based on estimations of real-time leakage current levels and/or actual power supply levels to a power domain of a system on a chip ("SoC"). In this way, embodiments of the solution ensure that a maximum amount of available power supply is allocated to dynamic power consumption for processing workloads without risking that the total power consumption (leakage power consumption+ dynamic power consumption) for the power domain exceeds the power supply capacity.

An exemplary method for managing power consumption in a power domain of a portable computing device ("PCD") begins by setting a peak dynamic power threshold to an initial level. The peak dynamic power threshold determines an allocation of power supplied to a power domain of a SoC for workload processing. The power domain may comprise one or more processing components that consume power, as would be understood by one of ordinary skill in the art. The exemplary method then monitors the operating temperatures of the one or more processing components, as well as voltage levels supplied to the one or more processing components. With the monitored operating temperatures and active voltage levels, the method may then calculate an optimum level for the peak dynamic power threshold based on an estimated leakage power level calculated from the monitored temperature and voltage levels associated with the one or more processing components. Notably, certain embodiments may also monitor parameters indicative of the actual power supply level and further consider the actual power supply level in the calculation of the optimum peak dynamic power threshold. Once the optimum level for the peak dynamic power threshold is calculated, it may be compared to the set level of the threshold and, if different, the peak dynamic power threshold may be adjusted to the optimum level. The adjusted threshold may then be used to trigger adjustments to throttling levels for one or more of the processing components.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures. Further, the use of a lower case "n" as a letter character designation is meant to indicate that any number of parts having the same reference numeral may be comprised within a given embodiment of the solution. Even so, the absence of a lower case "n" as a letter character designation will not be construed to suggest that an embodiment of the solution is limited to any specific number of a given part.

DETAILED DESCRIPTION

Figure 1:
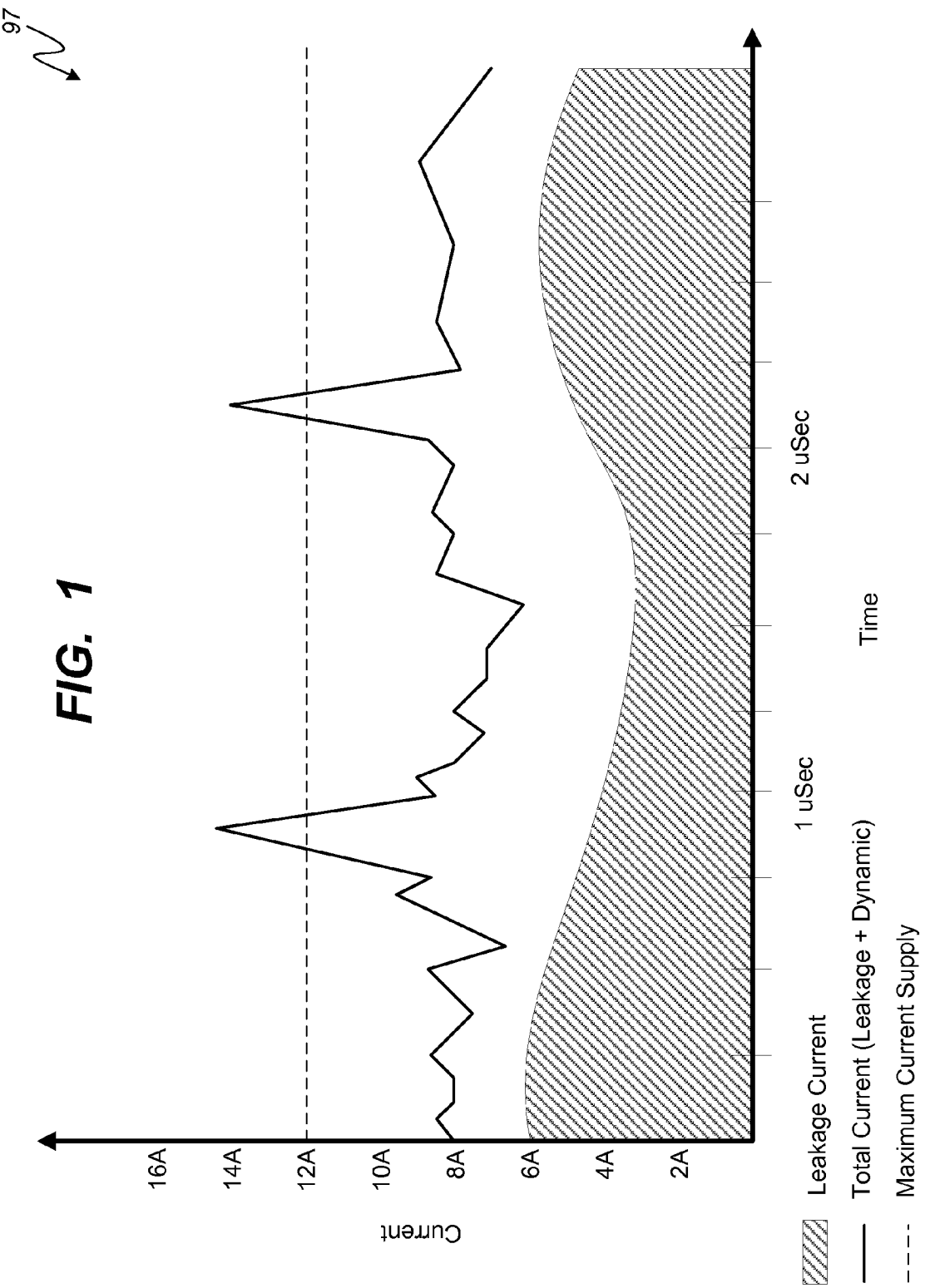
FIG. 1 is a graph illustrating a total current consumption by a system on a chip ("SoC") resulting from a leakage current consumption and a dynamic current consumption.

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component," "estimator," "calculator," "limiter," "regulator" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, the terms "workload," "process load" and "process workload" are used interchangeably and generally directed toward the processing burden, or percentage of processing burden, associated with a given processing component or functional block in a given embodiment. Further to that which is defined above, a "processing component" or "functional block" consumes power to process a workload and may be, but is not limited to, a central processing unit, a graphical processing unit, a core, a main core, a sub-core, a processing area, a hardware engine, a modem, a camera subsystem, etc. or any component residing within, or external to, an integrated circuit within a portable computing device.

In this description, the terms "peak current management," "current management," "peak power management," "power management" and the like generally refer to measures and/or techniques for optimizing the use of power supplied from a PMIC and to a SoC. It is an advantage of various embodiments that the current supply may be managed by peak power management techniques to optimize user experience and provide higher levels of quality of service without violating a peak current threshold associated with a voltage regulator(s).

In this description, the term "portable computing device" ("PCD") is used to describe any device configured to operate on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, a notebook computer, an ultrabook computer, a tablet personal computer ("PC"), among others.

Exemplary methods and systems generally referred to herein as including peak dynamic power ("PDP") management module(s) seek to monitor, analyze and manage a power supply in a PCD. A PDP module, perhaps in conjunction with a monitoring module, seeks to monitor and manage a peak dynamic current budget in view of real-time assessments of a power supply level, voltage level(s) and a leakage current level(s). In doing so, a PDP module may maximize a power supply allocation to processing components on a SoC for workload processing. A PDP module may also work with a dynamic control and voltage scaling ("DCVS") system to modify a clock frequency or voltage level to one or more processing components such that an overall current demand is adjusted and the peak current level maintained within a dynamic current budget. It is envisioned that in certain embodiments a PDP module may determine an input to a DCVS module based partly on operating temperatures of processing components controlled by the DCVS module.

A PDP solution may be either a hardware or software scheme, or combination thereof, that works to dynamically adjust the peak dynamic power limit and/or the operating frequency limit based on an estimated silicone leakage change and power supply capability change. In doing so, a PDP solution maximizes the amount of power allocated for workload processing while ensuring that the total power consumed does not exceed the power supply capacity.

FIG. 1 shows a graph 97 illustrating a total current consumption by a system on a chip ("SoC") resulting from a leakage current consumption and a dynamic current consumption. As can be seen in graph 97, a total current level consumed by one or more function blocks on the SoC is the sum of the leakage current consumption and the dynamic current consumption. As one of ordinary skill in the art would understand, the leakage current is a function of the temperature of the function blocks and may change slowly as the temperature(s) rise or fall with thermal energy generation and/or dissipation. By contrast, the dynamic power is a function of the workload(s) being processed by the function blocks. As a workload for a given function block increases, the amount of dynamic current consumed by the functional block must also increase. Similarly, as a workload decreases, so does the dynamic power being consumed by the function block that is processing the workload. Consequently, the amount of dynamic power being consumed is prone to "spikes" as short term workloads are processed by various function blocks on a SoC.

In many PCDs, the available power capacity is designed for very short, peak power demands. In the graph 97, the x-axis represents time and the y-axis represents power consumption (illustrated as amperes of current consumption). The lower portion of the graph 97 shown in a hatched pattern depicts the portion of the overall power consumption attributable to silicon leakage power. The upper portion of the graph 97 shown above the hatched pattern and beneath the total current trace depicts the portion of the overall power consumption attributable to dynamic leakage, i.e. the portion of the total power consumption due to clocking and frequency settings of the functional blocks.

Notably, the leakage power being consumed is independent of frequency/clocking of the functional blocks. Leakage power consumption changes slowly whereas dynamic power consumption changes quickly based on workload changes. As can further be seen in the exemplary graph 97, the total current demand may peak at levels above the maximum current supply (illustrated as 12A in the FIG. 1 graph 97) if not managed.

Figure 2:
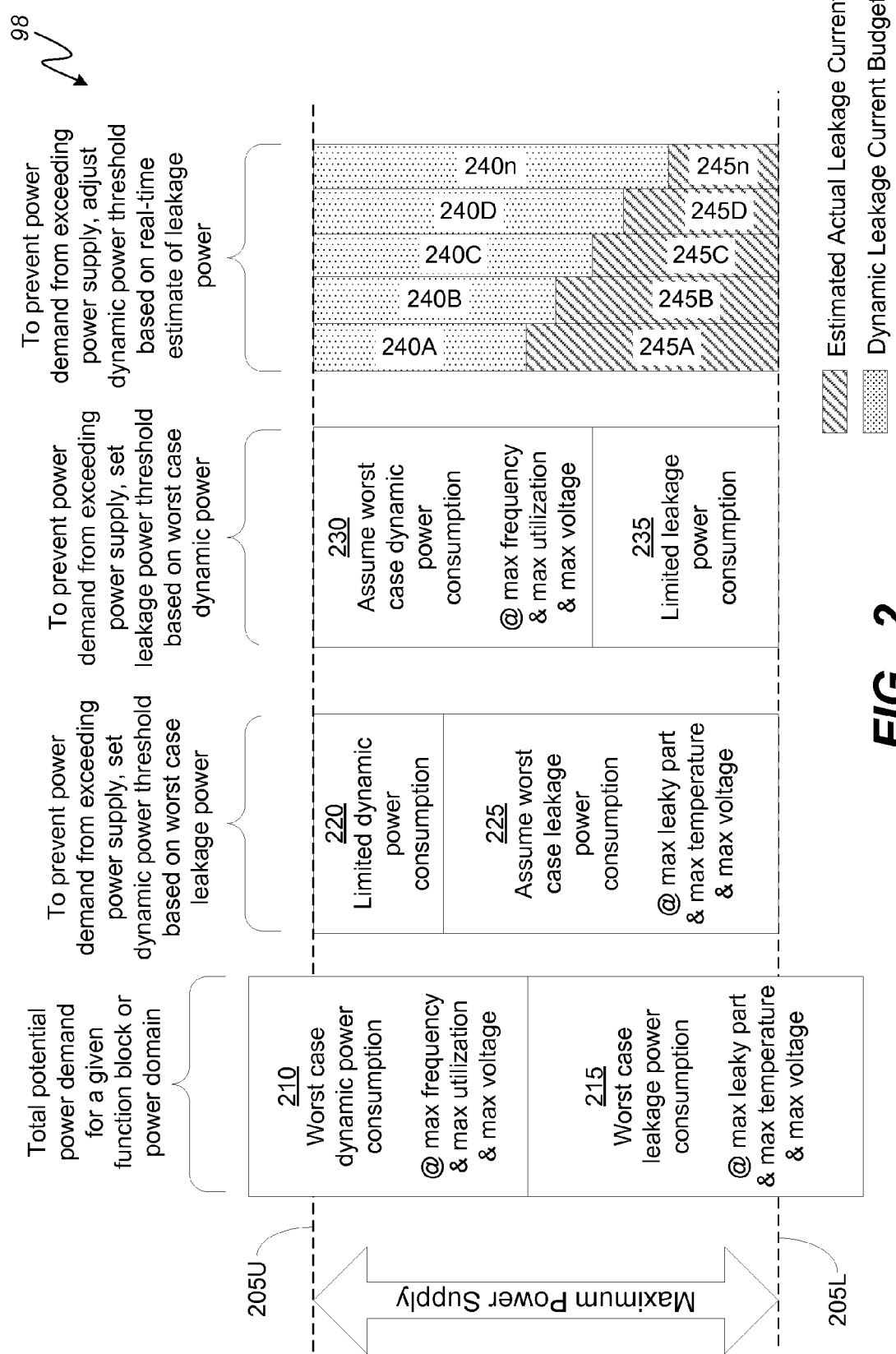
FIG. 2 is a graph illustrating certain benefits of a peak dynamic power ("PDP") management methodology in a system on a chip ("SoC") having a maximum power supply that is exceeded by the sum of a worst case dynamic power consumption level and a worst case leakage power consumption level.

FIG. 2 shows a diagram 98 illustrating certain benefits of a peak dynamic power ("PDP") management methodology in a system on a chip ("SoC") having a maximum power supply that is exceeded by the sum of a worst case dynamic power consumption level and a worst case leakage power consumption level. At the left side of the diagram 98, a maximum power supply capacity is represented by the span between upper and lower dotted horizontal lines 205U, 205L. As would be understood by one of ordinary skill in the art, the demand for power by function blocks on the SoC must be managed to stay within the maximum power supply capacity.

Blocks 210 and 215 represent, respectively, a worst case scenario for dynamic power consumption and leakage power consumption for an exemplary SoC. Notably, the sum of the worst case dynamic power and leakage power exceeds the maximum power supply capacity. As such, PCD designers for the exemplary SoC must manage the power demand on the SoC such that the demand does not exceed the maximum power supply.

Blocks 220 and 225 represent a power management technique for ensuring that the total power demand for the exemplary SoC does not exceed the maximum power supply. For the technique represented by blocks 220 and 225, the worst-case leakage power consumption 225 is assumed, leaving the remainder of the power supply (the difference in the maximum power supply and the worst case leakage power consumption 225) as the maximum available power supply for allocation to dynamic power consumption. Consequently, the peak dynamic power threshold is limited to the amount represented by block 220 even if the actual maximum power supply is increased and/or the actual leakage power consumption is less than the worst case 225. Because the peak dynamic power threshold may be overly limited in certain applications, the technique represented by blocks 220 and 225 may not optimize the allocation of available power and thus cause QoS (as measured in terms of processing performance or throughput, for example) to suffer unnecessarily.

Blocks 230 and 235 also represent a power management technique for ensuring that the total power demand for the exemplary SoC does not exceed the maximum power supply. For the technique represented by blocks 230 and 235, the worst case dynamic power consumption 230 is assumed, leaving the remainder of the power supply (the difference in the maximum power supply and the worst case dynamic power consumption 230) as the maximum available power supply for allocation to leakage power consumption. Consequently, the peak leakage power threshold is limited to the amount represented by block 235 even if the actual maximum power supply is increased and/or the actual dynamic power consumption is less than the worst case 230. Because the peak leakage power threshold may be overly limited in certain applications, the technique represented by blocks 230 and 235 may unnecessarily trigger the application of thermal mitigation techniques in an effort to reduce leakage power consumption and, in doing so, cause QoS (as measured in terms of processing performance or throughput, for example) to suffer unnecessarily.

Blocks 240 and 245 represent the application of an exemplary method for peak dynamic power ("PDP") management according to an embodiment of the solution proposed herein. As can be seen from the relationship between blocks 240 and 245, a PDP management solution works to optimize the amount of power allocated to dynamic power consumption by varying the peak dynamic power threshold in view of changes in leakage power consumption. Additionally, some embodiments of a PDP management solution may also take into consideration variations in the actual amount of power supply available. Notably, as the leakage power consumption 245 trends downward in the FIG. 2 illustration from 245A to 245n, the amount of power supply allocated to the dynamic power consumption 240 trends upward from 240 to 240n. In this way, a PDP management methodology may ensure that the maximum amount of available power supply is allocated to dynamic power, thereby optimizing the ability to process workloads and maintain a high QoS level (as measured in terms of processing performance or throughput, for example).

Figure 3:
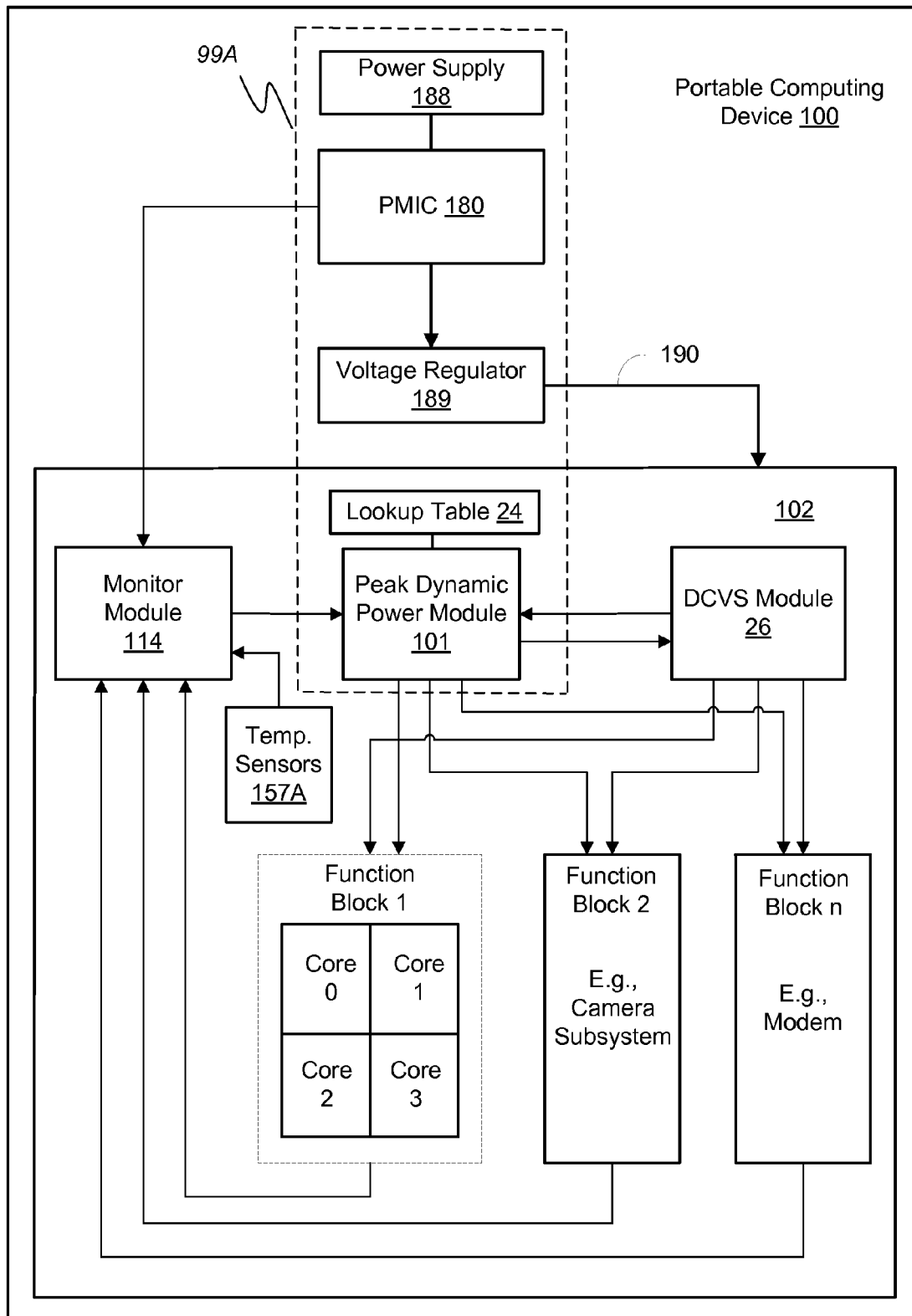
FIG. 3 is a functional block diagram illustrating an exemplary embodiment of a system for peak dynamic power ("PDP") management to a system on a chip ("SoC") in a portable computing device ("PCD")

FIG. 3 is a functional block diagram illustrating an exemplary embodiment of a system 99A for peak dynamic power ("PDP") management to a system on a chip ("SoC") 102 in a portable computing device ("PCD") 100. As can be seen in the exemplary illustration of FIG. 3, a power management integrated circuit ("PMIC") 180 is configured to supply power to each of one or more exemplary processing components or function blocks residing within the SoC 102. As depicted, the power is sourced from a power supply 188 (such as a battery or an AC power source) and distributed by the PMIC 180 to the SoC 102 through a voltage regulator 189 and via a number of dedicated sets of power rails 190 (only one set being shown in FIG. 3). Notably, each of cores 0, 1, 2 and 3 of function block 1 (such as may be the case for a CPU 110 or GPU 182 (shown in FIG. 5 and discussed below) may have its own dedicated power rail 190, as would be understood by one of ordinary skill in the art. Moreover, one of ordinary skill in the art will recognize that any core, sub-core, sub-unit or the like within a processing component, may share a common power rail with complimentary components or have a dedicated power rail 190 and, as such, the particular architecture illustrated in FIG. 3 is exemplary in nature and will not limit the scope of the disclosure.

Returning to the FIG. 3 illustration, one or more temperature sensors 157A are configured to sense operating temperatures (such as junction temperatures) associated with the various function blocks and generate signals, to monitor module 114, indicative of those temperatures. The monitor module 114 may monitor the temperature signals and provide them to the peak dynamic power ("PDP") module 101 that, in turn, may use the temperature readings to query a lookup table 24 and determine an active leakage current associated with each of the function blocks. Notably, it is envisioned that certain embodiments of the solution may use current sensors in an effort to monitor the power rails 190. The current sensors may be of a type such as, but not limited to, a Hall effect type for measuring the electromagnetic field generated by current flowing through a power rail 190, a shunt resistor current measurement type for calculating current from voltage drop measured across a resistor in a power rail 190, or any type known to one of ordinary skill in the art. As such, while the particular design, type or configuration of a sensor 157 that may be used in an embodiment of the systems and methods may be novel in, and of, itself, the systems and methods are not limited to any particular type of sensor 157. Essentially, the sensors 157, regardless of type or location, may be used by a given embodiment of the solution to deduce leakage power consumption associated with one or more function blocks and/or power supply levels associated with PMIC 180 via voltage regulator(s) 189.

As described above, monitor module 114 may monitor and receive the signals generated by the sensor(s) 157 to indicate actual, near real-time leakage power consumption of the function blocks and actual, near real-time power supply levels from the PMIC 180. Notably, although the monitor module 114 and PDP module 101 are depicted in the FIG. 3 illustration as residing on the SoC 102, one of ordinary skill in the art will recognize that either or both may reside off chip 102 in certain embodiments. Moreover, one of ordinary skill in the art will recognize that, in some embodiments of a PCD 100, the monitor module 114 and/or certain sensors 157 may be included in the PMIC 180.

As one of ordinary skill in the art will recognize, embodiments of the PDP module 101 and/or monitor module 114 may include hardware and/or software interrupts handled by an interrupt service routine. That is, depending on the embodiment, a PDP module 101 and/or monitor module 114 may be implemented in hardware as a distinct system with control outputs, such as an interrupt controller circuit, or implemented in software, such as firmware integrated into a memory subsystem.

Returning to the FIG. 3 illustration, the monitor module 114 monitors a signal from one or more temperature sensors 157A to track leakage power consumption levels of active components associated with the various rails. In addition to the temperature sensors 157A, monitor module 114 may also monitor sensors 157B (not shown) associated with the PMIC 180 to recognize parameters useful for determining an actual provided power supply level. The monitor module 114 may subsequently communicate with the PDP module 101 to relay the monitored data indicative of active leakage power consumption of functional blocks residing on the SoC 102 and actual power supply levels available from the PMIC 180. Advantageously, the PDP module 101 may use the monitored data to determine an actual available power supply for allocation to dynamic power consumption by the various function blocks and then adjust a peak dynamic current threshold based on the determination. An adjusted peak dynamic current threshold may be used to trigger a dynamic control and voltage scaling (DCVS) module 26 to throttle the function blocks to optimal workload processing levels, as would be understood by one of ordinary skill in the art of dynamic control and voltage scaling of processing components. Through application of the throttling adjustments by the DCVS module 26, the PDP module 101 may effectively optimize user experience by maintaining current consumption of the function block(s) beneath a dynamic and optimized peak current threshold.

Figure 4:
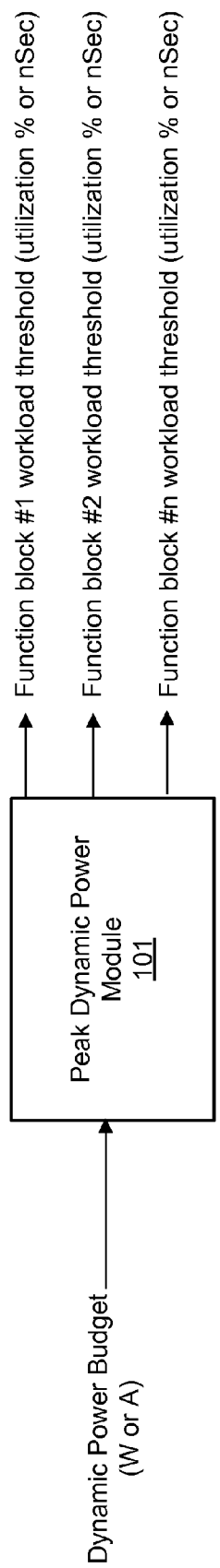
FIG. 4 illustrates an exemplary aspect of a peak dynamic power lookup table that may be used by the exemplary peak dynamic power ("PDP") management system of FIG. 3.

FIG. 4 illustrates an exemplary aspect of a peak dynamic power lookup table 24 that may be used by the exemplary peak dynamic power ("PDP") management system 99A of FIG. 3. As described relative to FIG. 3 and reiterated at the top of FIG. 4, the PDP module 101 receives inputs, from the monitor module 114, that may be used to determine a real-time dynamic power budget that includes an active leakage power consumption and dynamic power allocation. Using the dynamic power allocation, the PDP module 101 may adjust a peak current threshold such that workload capacities for the various function blocks may be optimized.

Figure 5:
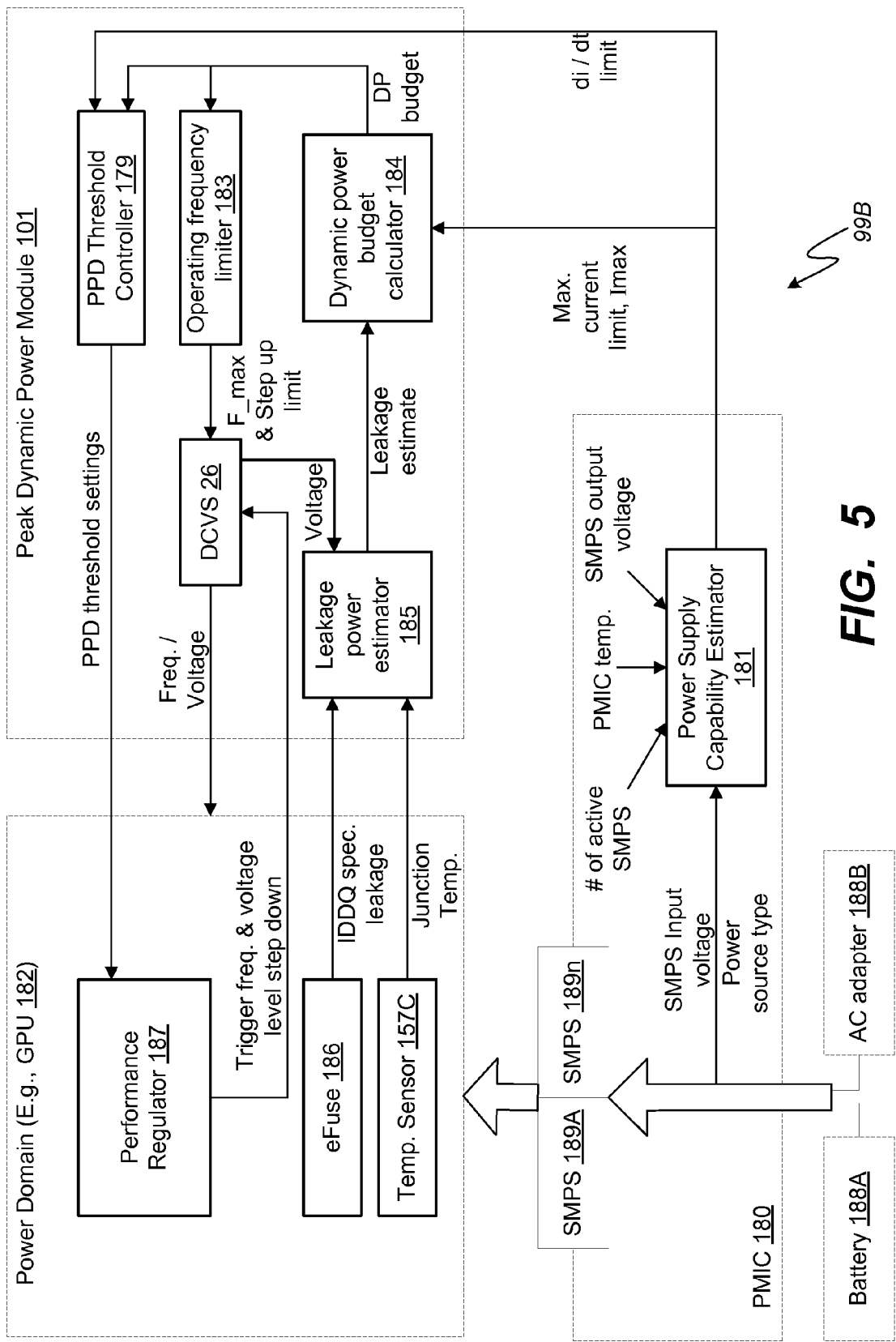
FIG. 5 is a functional block diagram illustrating further detail for certain aspects of the exemplary peak dynamic power ("PDP") management system of FIG. 3.

Using the dynamic power budget calculation that is derived from an estimate of the actual leakage power levels, the PDP module 101 may query a lookup table 24 to determine threshold settings for the various function blocks. FIG. 5 is a functional block diagram illustrating further detail for certain aspects of the exemplary peak dynamic power ("PDP") management system 99 of FIG. 3. With reference to FIG. 4 and FIG. 5, for the exemplary table, suppose that the PDP module 101 has determined that a peak power threshold for a GPU 182 is between 4 W and 5 W (notably, in certain embodiments it may have determined that the peak current threshold is within a certain range—as one of ordinary skill in the art would understand, references to power and current may be interchangeable within the context of the solutions described herein). Using the table, the PDP module 101 may set various function blocks of the GPU 182 (such as a shader processor, texture processor, etc.) to optimum workload processing levels. For example, the PDP module 101 may cause function block #1 to be set to a workload processing level of 10 frames per second, function block #2 to be set to 20 frames per second and so on. As another example, the PDP module 101 may cause function block #1 to be set to a workload processing level based on millions of instructions per second ("MIPS") if the function block #1 were a core associated with a CPU 110.

The FIG. 5 illustration includes three main components of the system 99—the PMIC 180, the PDP module 101 and a power domain (e.g. GPU 182). As described above, the PMIC 180 supplies power to the power domain which resides on the SoC 102. And, the PDP module 101 adjusts the peak current threshold for that power supply in order to optimize the amount of power allocated to the power domain for workload processing (i.e., to optimize the dynamic power budget).

As shown in FIG. 5, a power source (shown as battery 188A or AC adapter 188B) may be in the form of a battery 188A or an AC adapter 188B, as would be understood by one of ordinary skill in the art. The PMIC 180 supplies the power to the power domain on the SoC 102 via one or more switching mode power supplies (voltage regulators) shown as SMPS 189A and SMPS 189. Notably, the power supplied via the switching mode power supplies ("SMPS") 189 to the power domain may vary depending on any number of factors including, but not limited to, SMPS input voltage, power source type, number of SMPS allocated to the power domain, temperature of the PMIC 180, output voltage of the various SMPS, etc. As such the PMIC 180 may include a power supply capability estimator 181 that works with the monitor module 114 (not shown) or includes its own monitor module to monitor the factors and estimate an actual power supply level to the power domain based on the factor readings.

The power supply capability estimator 181 may indicate the maximum power supply level (or maximum current level, as the case may be) coming out of the PMIC 180 to the PDP module 101.

With reference still to FIG. 5, the maximum power supply level is indicated to a dynamic power budget calculator 184. The dynamic power budget calculator 184 may also receive an active leakage power level estimate from a leakage power estimator 185 which may have estimated the active leakage power level based on active voltage inputs from the DCVS module 26, temperature inputs from the temperature sensors 157C and queried IDDQ specification leakages from the eFuse 186. The eFuse 186 may exist in ROM 112, as would be understood by one of ordinary skill in the art. Further, and as would be understood by one of ordinary skill in the art, the temperature readings and voltage levels may be used to determine an expected IDDQ leakage current level $[I_{leakage}=IDDQ*(e^{m*(V-Vref)+n*(Tj-Tref)})]$.

Returning to the dynamic power budget calculator 184, it may calculate the amount of the actual power supply that may be allocated to dynamic power consumption $[I_{max}-P_{\_leakage}=P_{\_remain}]$. The dynamic power allocation is then provided to the operating frequency limiter 183 and the peak power demand ("PPD") threshold controller 179 which, in turn, may adjust the PPD threshold settings utilized by the performance regulator 187 of the power domain to govern its workload utilization.

The operating frequency limiter 183 may adjust the maximum frequency and bin step up limits based on the estimated actual power supply level and indicate as much to the DCVS module 26. The DCVS module 26 may, in turn, modulate the frequency of the power domain. Moreover, in the event that the amount of workload of the power domain exceeds the dynamic power budget set by the PPD threshold controller 179, a trigger signal may be provided back to the DCVS module 26 to reduce voltage in addition to frequency. In doing so, the power domain may be able to operate at a lower voltage for a drastically reduced frequency.

Figure 6:
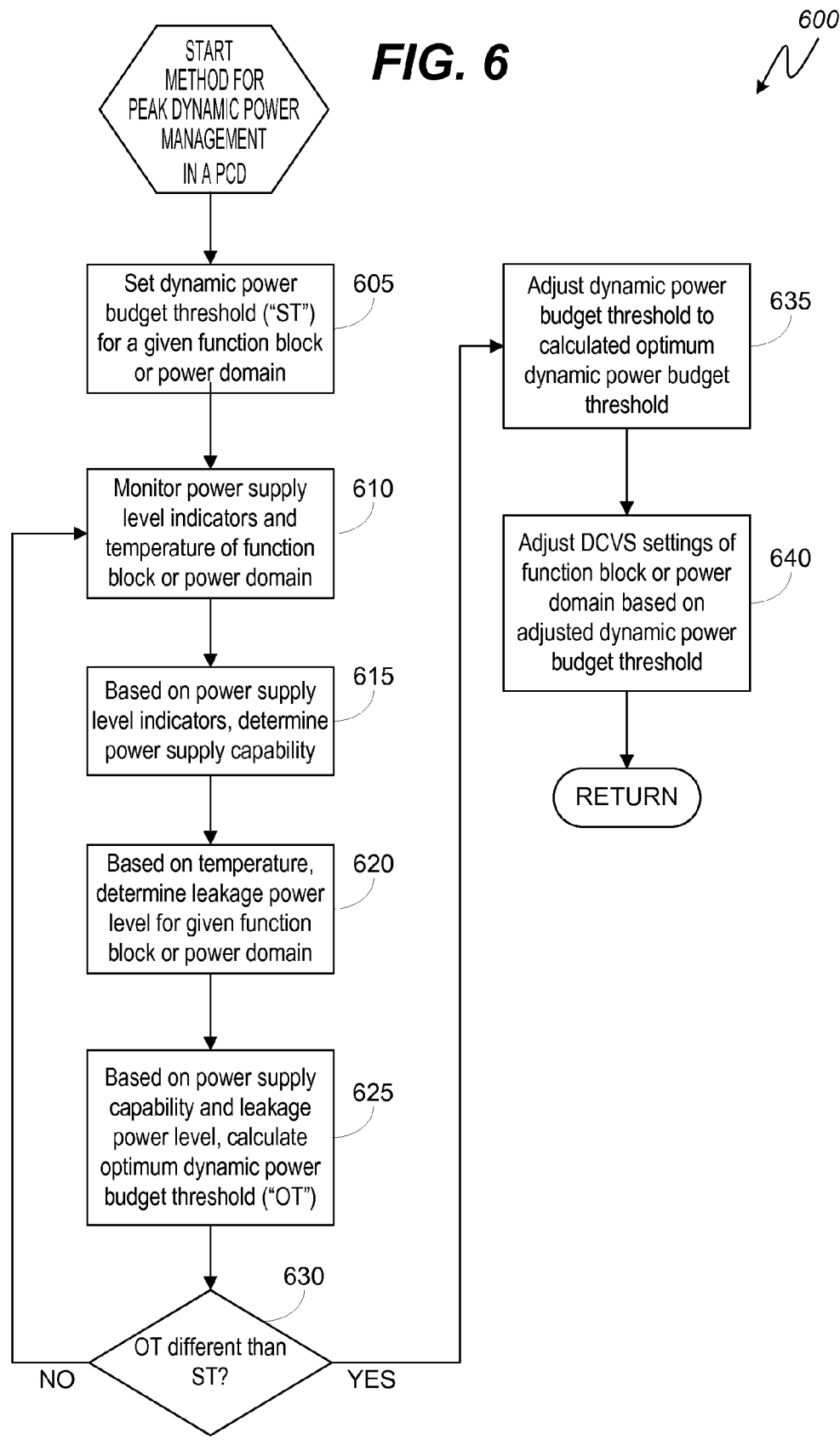
FIG. 6 is a logical flowchart illustrating a method for peak dynamic power ("PDP") management to a system on a chip ("SoC") in a portable computing device ("PCD")

FIG. 6 is a logical flowchart illustrating a method 600 for peak dynamic power ("PDP") management to a system on a chip ("SoC") 102 in a portable computing device ("PCD") 100. The method 600 begins at block 605 with the setting of an initial dynamic power budget threshold ("ST"). The dynamic power budget threshold may be associated with any unit of electrical measurement indicative of power consumption such as, but not limited to, watts or amperes. Also, the dynamic power budget threshold may be associated with a power domain on the SoC 102 that includes a single function block or a combination of function blocks. The amount of power provided to the power domain for processing workloads is dictated by the dynamic power budget threshold such that, if the threshold is exceeded, a DCVS module 26 may be triggered to adjust down frequency settings and/or voltage settings of one or more function blocks.

Once the dynamic power budget threshold is set, at block 610, the monitor module 114 and/or the PDP module 101 may monitor the power supply level indicators, the operating temperature(s) associated with the power domain, the voltage being supplied to the power domain, etc. Next, at block 615, based on the power supply level indicators, the PDP module 101 may determine the actual power supply level being provided from the PMIC 180 to the power domain. At block 620, based on the operating temperature(s) of the power domain, the PDP module 101 may estimate the amount of power being consumed by the power domain due to leakage current of the function block(s). Based on the actual power supply level and the estimated leakage current consumption, at block 625 the PDP module 101 may determine a remaining amount of the power supply that may be allocated for dynamic power consumption, i.e. power that may be used for processing workloads. Using the remaining power budget, an optimum dynamic power budget threshold ("OT") may be determined.

Once the OT is determined, at decision block 630 the PDP module 101 may compare the OT to the previously set dynamic power budget threshold ST. If there is no significant difference between the ST and the OT, the "no" branch may be followed back to block 610 and the various parameters monitored further. If, however, the OT differs from the ST, the "yes" branch may be followed to block 635 and the dynamic power budget threshold modified to the calculated OT. The method 600 then proceeds to block 640 and the DCVS module 26 may modify frequency and/or voltage settings to the one or more function blocks based on the new OT power budget threshold. The method 600 returns and repeats such that the OT may be modified per a subsequently calculated OT in the event that the power supply level changes and/or the leakage current consumption of the power domain changes. In this way, a peak dynamic power management methodology may ensure that a maximum available power supply headroom is allocated to workload processing at any given point in time, thereby optimizing the QoS (as measured in terms of processing performance or throughput, for example) experienced by a user of the PCD 100.

Figure 7:
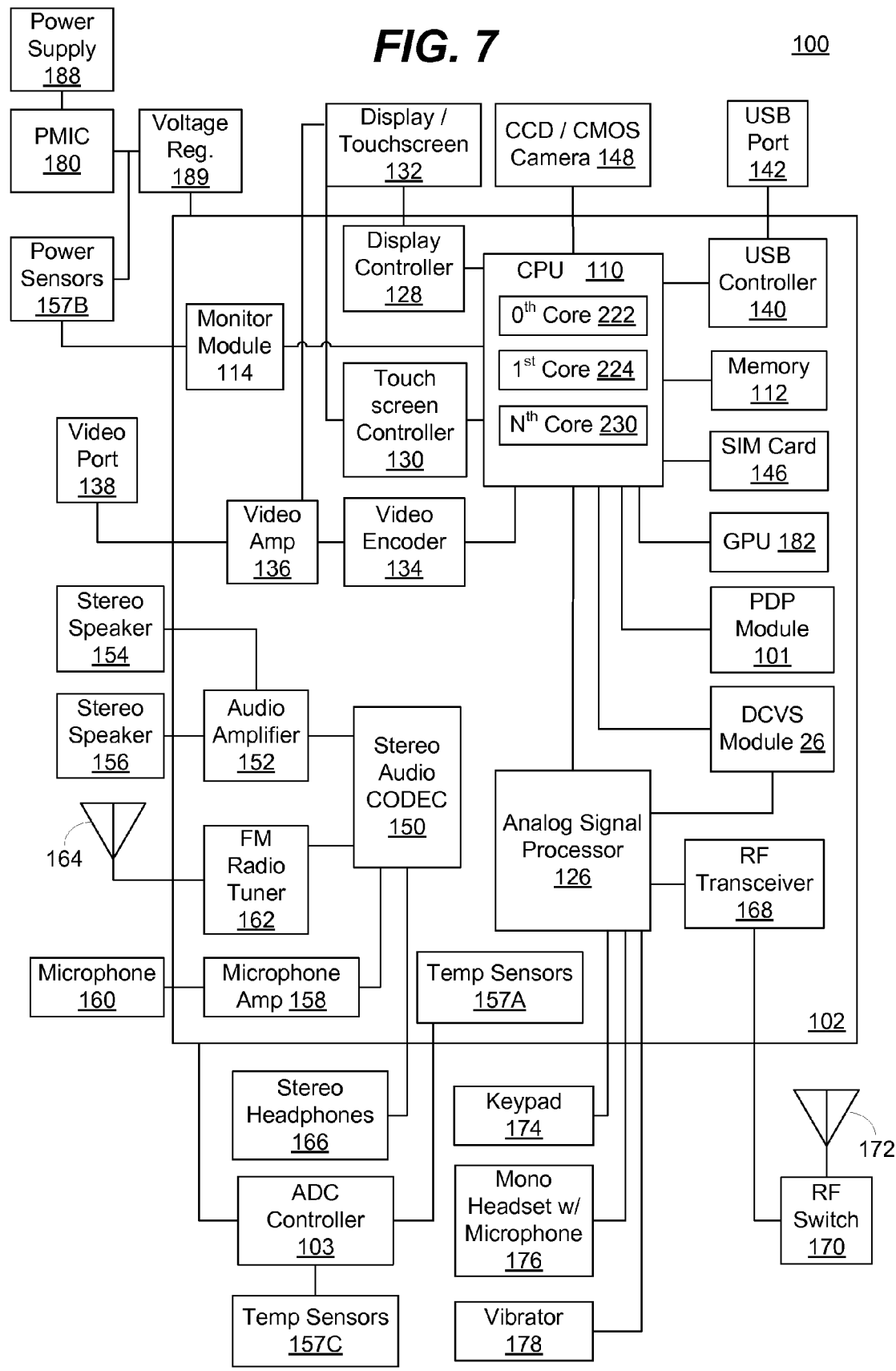
FIG. 7 is a functional block diagram of an exemplary, non-limiting aspect of a portable computing device ("PCD") in the form of a wireless telephone for implementing methods and systems for peak dynamic power ("PDP") management.

FIG. 7 is a functional block diagram of an exemplary, non-limiting aspect of a portable computing device ("PCD") 100 in the form of a wireless telephone for implementing methods and systems for peak dynamic power ("PDP") management. As shown, the PCD 100 includes SoC 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the peak dynamic power ("PDP") module 101, in conjunction with the monitor module 114, may be responsible for monitoring leakage current consumption levels, power supply levels, determining optimum dynamic current budgets, and applying peak current management techniques to help a PCD 100 optimize its power consumption and maintain a high level of functionality. Further, the PDP module 101 may consider operating temperatures of one or more processing components or function blocks in a power domain when determining an appropriate adjustment to a peak dynamic current threshold.

The monitor module 114 communicates with multiple operational sensors 157 distributed throughout the on-chip system 102 and/or PMIC 180 and with the CPU 110 of the PCD 100 as well as with the PDP module 101. In some embodiments, monitor module 114 may also monitor power sensors 157B for current consumption rates uniquely associated with the cores 222, 224, 230 and transmit the power consumption data to the PDP module 101 and/or a database (which may reside in memory 112). The PDP module 101 may work with the monitor module 114 to determine available dynamic current budgets for processing components residing on the SoC 102 such that a peak current threshold for power through the voltage regulator 189 is adjusted to optimum levels.

As illustrated in FIG. 7, a display controller 128 and a touch screen controller 130 are coupled to the digital signal processor 110. A touch screen display 132 external to the on-chip system 102 is coupled to the display controller 128 and the touch screen controller 130. A PDP module 101 may monitor temperatures and voltage levels for the cores 222, 224, 230, for example, and work with the DCVS module 26 to manage power consumed by the cores for workload processing.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 3, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 7, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 7, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 7 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 7 further indicates that a radio frequency ("RF") transceiver 168 may be coupled to the analog signal processor 126. An RF switch 170 may be coupled to the RF transceiver 168 and an RF antenna 172. As shown in FIG. 7, a keypad 174 may be coupled to the analog signal processor 126. Also, a mono headset with a microphone 176 may be coupled to the analog signal processor 126. Further, a vibrator device 178 may be coupled to the analog signal processor 126. FIG. 7 also shows that a power supply 188, for example a battery, is coupled to the on-chip system 102 through PMIC 180. In a particular aspect, the power supply 188 includes a rechargeable DC battery or a DC power supply that is derived from an alternating current ("AC") to DC transformer that is connected to an AC power source. Power from the PMIC 180 is provided to the chip 102 via a voltage regulator 189.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157C may be employed without departing from the scope of the invention.

The PDP module(s) 101 may comprise software that is executed by the CPU 110. However, the PDP module(s) 101 may also be formed from hardware and/or firmware without departing from the scope of the invention.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more PDP module(s) 101. These instructions that form the PDP module(s) 101 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 8:
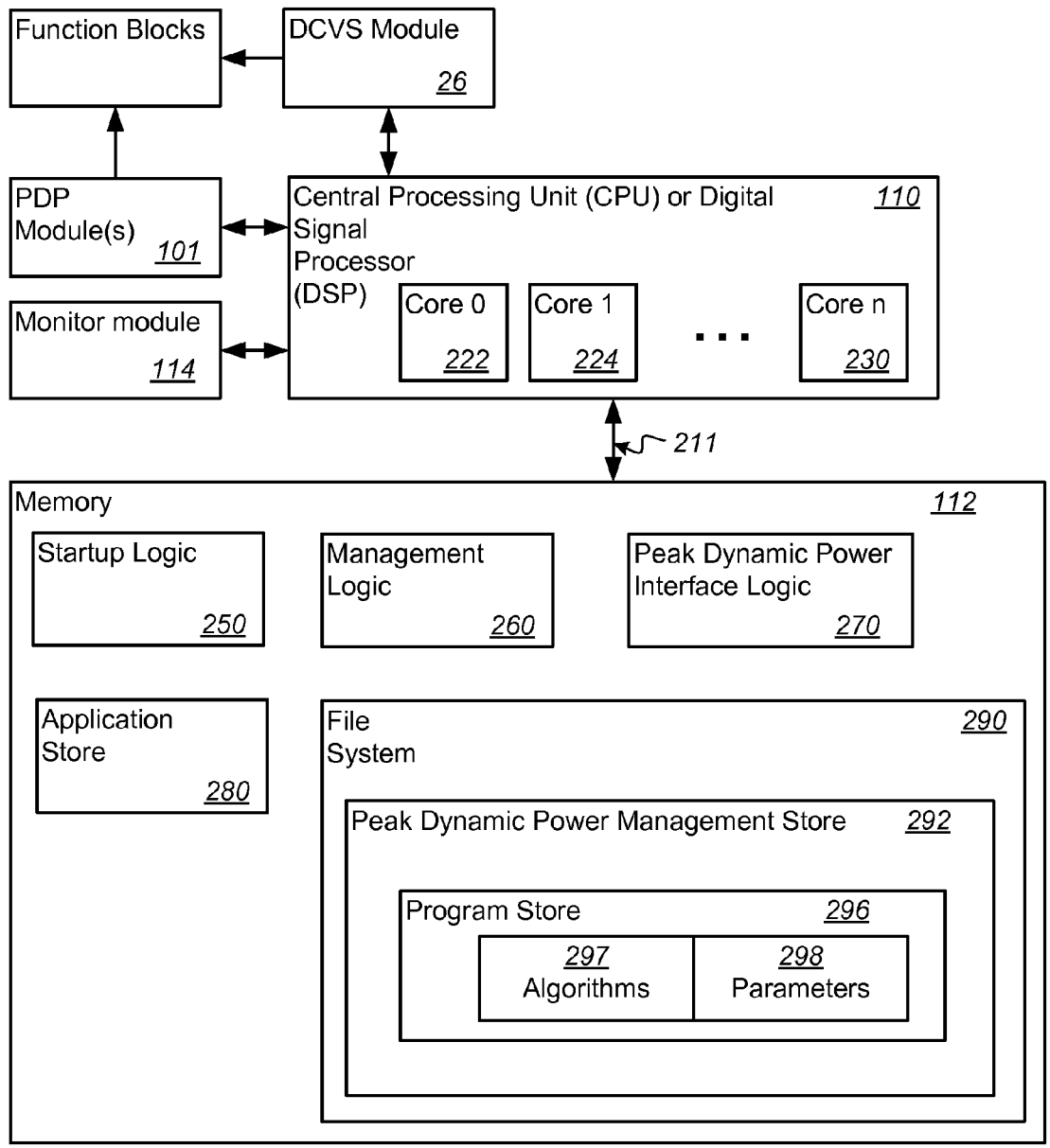
FIG. 8 is a schematic diagram illustrating an exemplary software architecture of the portable computing device ("PCD") of FIG. 7 for supporting application of algorithms associated with peak dynamic power management techniques.

FIG. 8 is a schematic diagram illustrating an exemplary software architecture of the portable computing device ("PCD") 100 of FIG. 7 for supporting application of algorithms associated with peak dynamic power management techniques. Any number of algorithms may form or be part of at least one peak dynamic power management technique that may be applied by the PDP module 101 when certain power supply budgets are determined and certain operating temperatures are recognized in a given power domain.

As illustrated in FIG. 8, the CPU or digital signal processor 110 is coupled to the memory 112 via a bus 211. The CPU 110, as noted above, is a multiple-core processor having "n" core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores.

The CPU 110 may receive commands from the PDP module(s) 101 that may comprise software and/or hardware. If embodied as software, the PDP module(s) 101 comprises instructions that are executed by the CPU 110 that issues commands to other application programs being executed by the CPU 110 and other processors. For example, the PDP module(s) 101 may instruct CPU 110 to cause a certain active application program to cease so that leakage current consumption by the SoC 102 is maintained at a certain level.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 8, it should be noted that one or more of startup logic 250, management logic 260, peak dynamic power management interface logic 270, applications in application store 280 and portions of the file system 290 may be stored on any computer-readable device or medium for use by or in connection with any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any means that can store, communicate, propagate, or transport the program for use by or in connection with the instruction execution system, apparatus, or device.

The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program may be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the peak dynamic power interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor (or additional processor cores).

In one exemplary embodiment for managing peak dynamic power consumption to optimize user experience and QoS (as measured in terms of processing performance or throughput, for example), the startup logic 250 includes one or more executable instructions for selectively identifying, loading, and executing a select program for peak dynamic power management. A select program may be found in the program store 296 of the embedded file system 290 and is defined by a specific combination of a performance scaling algorithm 297 and a set of parameters 298. The select program, when executed by one or more of the core processors in the CPU 110, may operate in accordance with one or more signals provided by the monitor module 114 in combination with control signals provided by the one or more PDP module(s) 101 and DCVS module(s) 26 to scale or suspend the performance of the respective processor core in an effort to maintain dynamic current consumption by the SoC 102 at an optimal level in view of a dynamic peak current threshold.

The management logic 260 includes one or more executable instructions for terminating a peak dynamic power management program on one or more of the respective processor cores, as well as selectively identifying, loading, and executing a more suitable replacement program for managing or controlling the power draw of one or more of the available cores based on a calculated current budget. The management logic 260 is arranged to perform these functions at run time or while the PCD 100 is powered and in use by an operator of the device. A replacement program may be found in the program store 296 of the embedded file system 290.

The replacement program, when executed by one or more of the core processors in the digital signal processor, may operate in accordance with one or more signals provided by the monitor module 114 or one or more signals provided on the respective control inputs of the various processor cores to scale or suspend the performance of the respective processor core. In this regard, the monitor module 114 may provide one or more indicators of events, processes, applications, resource status conditions, elapsed time, temperature, current leakage, etc in response to control signals originating from the PDP module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to apply a desired throttling algorithm when the calculated dynamic power budget is beneath a certain value.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280, data in a database or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280, data in a database and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged peak dynamic power management store 292. In this regard, the file system 290 may include a reserved section of its total file system capacity for the storage of information for the configuration and management of the various parameters 298 and peak dynamic power management algorithms 297 used by the PCD 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing power consumption in a power domain of a portable computing device ("PCD"), the method comprising:
setting a peak dynamic power threshold to an initial level;
monitoring temperature of one or more processing components of a system on a chip ("SoC");
monitoring voltage levels supplied to the one or more processing components;
calculating an available level for the peak dynamic power threshold representing a remaining amount of power that may be allocated to the one or more processing components, wherein the available level is based on the leakage power level calculated from the monitored temperature and voltage levels associated with the one or more processing components;
determining that the available level of the peak dynamic power threshold differs from the initial level of the peak dynamic power threshold;
adjusting the peak dynamic power threshold to the available level; and
based on the adjusted peak dynamic power threshold, triggering adjustments to a throttling level for one or more functional blocks of one or more of the processing components.

2. The method of claim 1, further comprising monitoring one or more power level parameters indicative of an actual power supply level to the power domain, wherein:
calculating an available level for the peak dynamic power threshold further comprises basing the calculation on the actual power supply level to the power domain.

3. The method of claim 2, wherein the one or more power level parameters comprise: input voltage to a switching mode power supply, power source type, number of active switching mode power supplies, output voltage of a switching mode power supply, or temperature associated with a power management integrated circuit.

4. The method of claim 1, wherein the one or more processing components comprise: a graphical processing unit ("GPU"), a camera subsystem, a central processing unit ("CPU"), or a modem.

5. The method of claim 1, wherein the adjustments to a throttling level comprise one of reducing operating frequency or reducing execution throughput.

6. The method of claim 1, wherein the adjustments to a throttling level comprise one of increasing operating frequency or increasing execution throughput.

7. The method of claim 1, wherein the adjustments to a throttling level further comprise reducing operating frequency and voltage supplied to the power domain.

8. The method of claim 1, wherein triggering adjustments to the throttling level for one or more functional blocks of one or more of the processing components comprises determining a setting for the one or more functional blocks from a lookup table.

9. A computer system for managing power consumption in a power domain of a portable computing device ("PCD"), the system comprising
a peak dynamic power ("PDP") module operable to perform the following:
set a peak dynamic power threshold to an initial level;
monitor temperature of one or more processing components of a system on a chip ("SoC");
monitor voltage levels supplied to the one or more processing components;
calculate an available level for the peak dynamic power threshold representing a remaining amount of power that may be allocated to the one or more processing components, wherein the available level is based on the leakage power level calculated from the monitored temperature and voltage levels associated with the one or more processing components;
determine that the available level of the peak dynamic power threshold differs from the initial level of the peak dynamic power threshold;
adjust the peak dynamic power threshold to the available level; and
based on the adjusted peak dynamic power threshold, trigger adjustments to a throttling level for one or more functional blocks of one or more of the processing components.

10. The computer system of claim 9, wherein the PDP module is further operable to:
monitor one or more power level parameters indicative of an actual power supply level to the power domain; and
calculate the available level for the peak dynamic power threshold further based on the actual power supply level to the power domain.

11. The computer system of claim 10, wherein the one or more power level parameters comprise: input voltage to a switching mode power supply, power source type, number of active switching mode power supplies, output voltage of a switching mode power supply, or temperature associated with a power management integrated circuit.

12. The computer system of claim 9, wherein the one or more processing components comprise: a graphical processing unit ("GPU"), a camera subsystem, a central processing unit ("CPU"), or a modem.

13. The computer system of claim 9, wherein the adjustments to a throttling level comprise one of reducing operating frequency or reducing execution throughput.

14. The computer system of claim 9, wherein the adjustments to a throttling level comprise one of increasing operating frequency or increasing execution throughput.

15. The computer system of claim 9, wherein the adjustments to a throttling level further comprise reducing operating frequency and voltage supplied to the power domain.

16. The computer system of claim 9, wherein triggering adjustments to the throttling level for one or more functional blocks of one or more of the processing components comprises determining a setting for the one or more functional blocks from a lookup table.

17. A computer system for managing power consumption in a power domain of a portable computing device ("PCD"), the system comprising:
means for setting a peak dynamic power threshold to an initial level;
means for monitoring temperature of one or more processing components of a system on a chip ("SoC");
means for monitoring voltage levels supplied to the one or more processing components;
means for calculating an available level for the peak dynamic power threshold representing a remaining amount of power that may be allocated to the one or more processing components, wherein the available level is based on the leakage power level calculated from the monitored temperature and voltage levels associated with the one or more processing components;
means for determining that the available level of the peak dynamic power threshold differs from the initial level of the peak dynamic power threshold;
means for adjusting the peak dynamic power threshold to the available level; and
means for triggering adjustments to a throttling level for one or more functional blocks of one or more of the processing components based on the adjusted peak dynamic power threshold.

18. The computer system of claim 17, further comprising means for monitoring one or more power level parameters indicative of an actual power supply level to the power domain, wherein:
calculating an available level for the peak dynamic power threshold further comprises basing the calculation on the actual power supply level to the power domain.

19. The computer system of claim 18, wherein the one or more power level parameters comprise: input voltage to a switching mode power supply, power source type, number of active switching mode power supplies, output voltage of a switching mode power supply, or temperature associated with a power management integrated circuit.

20. The computer system of claim 17, wherein the one or more processing components comprise: a graphical processing unit ("GPU"), a camera subsystem, a central processing unit ("CPU"), or a modem.

21. The computer system of claim 17, wherein the adjustments to a throttling level comprise one of reducing operating frequency or reducing execution throughput.

22. The computer system of claim 17, wherein the adjustments to a throttling level comprise one of increasing operating frequency or increasing execution throughput.

23. The computer system of claim 17, wherein the adjustments to a throttling level further comprise reducing operating frequency and voltage supplied to the power domain.

24. A non-transitory computer-readable programmable medium operable to cause a processor in a portable computing device to implement a method for managing power consumption in a power domain of the portable computing device ("PCD"), said method comprising:
setting a peak dynamic power threshold to an initial level;
monitoring temperature of one or more processing components of a system on a chip ("SoC");
monitoring voltage levels supplied to the one or more processing components;
calculating an available level for the peak dynamic power threshold representing a remaining amount of power that may be allocated to the one or more processing components, wherein the available level is based on the leakage power level calculated from the monitored temperature and voltage levels associated with the one or more processing components;
determining that the available level of the peak dynamic power threshold differs from the initial level of the peak dynamic power threshold;

adjusting the peak dynamic power threshold to the available level; and based on the adjusted peak dynamic power threshold, triggering adjustments to a throttling level for one or more functional blocks of one or more of the processing components.

25. The non-transitory computer-readable programmable medium of claim 24, further comprising monitoring one or more power level parameters indicative of an actual power supply level to the power domain, wherein:

calculating an available level for the peak dynamic power threshold further comprises basing the calculation on the actual power supply level to the power domain.

26. The non-transitory computer-readable programmable medium of claim 25, wherein the one or more power level parameters comprise: input voltage to a switching mode power supply, power source type, number of active switching mode power supplies, output voltage of a switching mode power supply, or temperature associated with a power management integrated circuit.

27. The non-transitory computer-readable programmable medium of claim 24, wherein the one or more processing components comprise: a graphical processing unit ("GPU"), a camera subsystem, a central processing unit ("CPU"), or a modem.

28. The non-transitory computer-readable programmable medium of claim 24, wherein the adjustments to a throttling level are selected from the group consisting of reducing operating frequency, reducing execution throughput and a combination thereof.

29. The non-transitory computer-readable programmable medium of claim 24, wherein the adjustments to a throttling level are selected from the group consisting of increasing operating frequency, increasing execution throughput and a combination thereof.

30. The non-transitory computer-readable programmable medium of claim 24, wherein the adjustments to a throttling level are selected from the group consisting of reducing operating frequency of the power domain, reducing voltage supplied to the power domain and a combination thereof.

* * * * *